United States Patent
Huang et al.

(10) Patent No.: US 10,499,439 B2
(45) Date of Patent: Dec. 3, 2019

(54) PRACH PREAMBLE SENDING METHOD, DEVICE, AND SYSTEM

(71) Applicant: HUAWEI TECHNOLOGIES CO., LTD., Shenzhen, Guangdong (CN)

(72) Inventors: Wenwen Huang, Shanghai (CN); Yueying Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/906,951

(22) Filed: Feb. 27, 2018

(65) Prior Publication Data
US 2018/0192440 A1 Jul. 5, 2018

Related U.S. Application Data

(63) Continuation of application No. PCT/CN2015/088393, filed on Aug. 28, 2015.

(51) Int. Cl.
*H04W 74/08* (2009.01)
*H04W 74/00* (2009.01)
(Continued)

(52) U.S. Cl.
CPC ..... *H04W 74/085* (2013.01); *H04W 72/0446* (2013.01); *H04W 74/004* (2013.01);
(Continued)

(58) Field of Classification Search
CPC ........... H04W 74/085; H04W 72/0446; H04W 74/008; H04W 74/004; H04W 88/08; H04W 88/02; H04W 74/0833
See application file for complete search history.

(56) References Cited

U.S. PATENT DOCUMENTS

2001/0024956 A1* 9/2001 You ..................... H04J 13/0044
455/455
2004/0184421 A1 9/2004 Hondo
(Continued)

FOREIGN PATENT DOCUMENTS

CN 1533055 A 9/2004
CN 101300755 A 11/2008
(Continued)

OTHER PUBLICATIONS

3GPP TS 25.214 V123.0 (Jun. 2015),3rd Generation Partnership Project;Technical Specification Group Radio Access Network;Physical layer procedures (FDD)(Release 12),total 137 pages.
(Continued)

*Primary Examiner* — Benjamin H Elliott, IV
(74) *Attorney, Agent, or Firm* — Fish & Richardson P.C.

(57) ABSTRACT

The present disclosure describes a physical random access channel (PRACH) preamble sending method. In one example method, access slot information is received by a user equipment (UE) from a controller. The received access slot information comprises a start access slot (AS) corresponding to each random access channel (RACH) sub-channel. ASs that start from the start AS and whose quantity is a quantity of PRACH preamble repetitions are used by the UE to send a same PRACH preamble. A PRACH preamble is repeatedly sent, by the UE, to a base station according to the received access slot information.

17 Claims, 8 Drawing Sheets

(51) Int. Cl.
*H04W 72/04* (2009.01)
*H04W 88/02* (2009.01)
*H04W 88/08* (2009.01)

(52) U.S. Cl.
CPC ...... *H04W 74/008* (2013.01); *H04W 74/0833* (2013.01); *H04W 88/02* (2013.01); *H04W 88/08* (2013.01)

(56) References Cited

U.S. PATENT DOCUMENTS

| | | | |
|---|---|---|---|
| 2005/0271025 A1* | 12/2005 | Guethaus | H04W 74/008 370/342 |
| 2008/0267126 A1 | 10/2008 | Vujcic et al. | |
| 2008/0279257 A1 | 11/2008 | Vujcic et al. | |
| 2009/0168750 A1* | 7/2009 | Pelletier | H04W 52/50 370/350 |
| 2016/0249387 A1 | 8/2016 | Zou et al. | |

FOREIGN PATENT DOCUMENTS

| | | |
|---|---|---|
| CN | 102264149 A | 11/2011 |
| CN | 102685892 A | 9/2012 |
| CN | 103477697 A | 12/2013 |
| EP | 2101509 A1 | 9/2009 |
| EP | 1987609 B1 | 12/2013 |

OTHER PUBLICATIONS

International Search Report in International Application No. PCT/CN2015/088393 dated May 20, 2016, 8 pages.
3GPP TSG-RAN WG1 Meeting #80bis R1-152071,"Additional considerations on the PRACH preamble repetition schemes",Ericsson, Apr. 20-24, 2015,total 4 pages.
3GPP TSG RAN WG1 Meeting #80bis R1-152262,"TP on coverage for UMTS SDT",Huawei, HiSilicon,Apr. 20-24, 2015,total 3 pages.
3GPP TR 25.705 V13.0.0 (Jun. 2015);3rd Generation Partnership Project;Technical Specification Group Radio Access Network;Study on small data transmission enhancements for UMTS(Release 13),total 68 pages.
Extended European Search Report issued in European Application No. 15902505.5 dated Jun. 5, 2018, 12 pages.
CN Office Action in Chinese Appln. No. 201580035188.6, dated Mar. 28, 2019, 10 pages (with English translation).

* cited by examiner

PRACH PREAMBLE SENDING METHOD, DEVICE, AND SYSTEM

CROSS-REFERENCE TO RELATED APPLICATIONS

This application is a continuation of International Application No. PCT/CN2015/088393, filed on Aug. 28, 2015, the disclosure of which is hereby incorporated by reference in its entirety.

TECHNICAL FIELD

Embodiments of the present application relate to communications technologies, and in particular, to a physical random access channel (PRACH) preamble sending method, a device, and a system.

BACKGROUND

Before performing data transmission with a base station, user equipment (UE) needs to initiate a random access process.

Generally, in a random access process, UE needs to randomly select an access slot (AS) from a sub-set of access slots defined by a random access channel (RACH) sub-channel that is available to the UE, and send a PRACH preamble to the base station by using the AS. If multiple UEs use a same signature sequence to send, in a same AS, PRACH preambles to the base station, the base station cannot distinguish between the PRACH preambles from the different UEs, causing access failures of the UEs using the same signature sequence. Generally, to improve a coverage capability of a PRACH preamble, UE sends a same PRACH preamble in multiple ASs, so that the base station can perform combined processing on such information that is repeated for multiple times, thereby improving coverage by using a combined gain. However, in the prior art, when UE repeatedly sends a PRACH preamble, a probability increases that multiple UEs use a same signature sequence to send, in a same AS, PRACH preambles to a base station.

Therefore, the prior art has a problem that there is a relatively high probability of an access failure when UE repeatedly sends a PRACH preamble.

SUMMARY

Embodiments of the present application provide a PRACH preamble sending method, a device, and a system.

According to a first aspect, an embodiment of the present application provides a physical random access channel (PRACH) preamble sending method, including:

determining, by a controller, access slot information according to at least one PRACH preamble repetition, where the access slot information includes a start access slot (AS) corresponding to each random access channel (RACH) sub-channel, and ASs that start from the start AS and whose quantity is the quantity of PRACH preamble repetitions are used by same user equipment (UE) to send a same PRACH preamble; and sending, by the controller, the access slot information to each UE, so that each UE repeatedly sends a PRACH preamble to a base station according to the access slot information.

With reference to the first aspect, in a first possible implementation of the first aspect, there is at least one RACH sub-channel.

With reference to the first aspect or the first possible implementation of the first aspect, in a second possible implementation of the first aspect, the start AS corresponding to each random access channel (RACH) sub-channel is a start AS corresponding to each RACH sub-channel in the case of different system frame numbers (SFNs).

With reference to the second possible implementation of the first aspect, in a third possible implementation of the first aspect, the SFN indicates the quantity of PRACH preamble repetitions corresponding to the start AS.

With reference to any one of the first aspect or the first or the second possible implementation of the first aspect, in a fourth possible implementation of the first aspect, the start AS indicates the quantity of PRACH preamble repetitions corresponding to the start AS.

According to a second aspect, an embodiment of the present application provides a physical random access channel (PRACH) preamble sending method, including:

receiving, by user equipment (UE), access slot information from a controller, where the access slot information includes a start access slot (AS) corresponding to each random access channel (RACH) sub-channel, and ASs that start from the start AS and whose quantity is a quantity of PRACH preamble repetitions are used by same UE to send a same PRACH preamble; and repeatedly sending, by the UE, a PRACH preamble to a base station according to the access slot information.

With reference to the second aspect, in a first possible implementation of the second aspect, there is at least one RACH sub-channel.

With reference to the second aspect or the first possible implementation of the second aspect, in a second possible implementation of the second aspect, the start AS corresponding to each random access channel (RACH) sub-channel is a start AS corresponding to each RACH sub-channel in the case of different system frame numbers (SFNs).

With reference to the second possible implementation of the second aspect, in a third possible implementation of the second aspect, the SFN indicates the quantity of PRACH preamble repetitions corresponding to the start AS.

With reference to any one of the second aspect or the first or the second possible implementation of the second aspect, in a fourth possible implementation of the second aspect, the start AS indicates the quantity of PRACH preamble repetitions corresponding to the start AS.

With reference to any one of the second aspect or the first to the fourth possible implementations of the second aspect, in a fifth possible implementation of the second aspect, the repeatedly sending, by the UE, a PRACH preamble to a base station according to the access slot information includes:

determining, by the UE, that the quantity of PRACH preamble repetitions is N, where N is a positive integer greater than or equal to 1;

determining, by the UE according to the access slot information, that a quantity of PRACH preamble repetitions corresponding to a first start AS is N; and repeatedly sending, by the UE in N ASs starting from the first start AS, the PRACH preamble to the base station for N times.

According to a third aspect, an embodiment of the present application provides a controller. The controller includes:

a processing module, configured to determine access slot information according to at least one PRACH preamble repetition, where the access slot information includes a start access slot (AS) corresponding to each random access channel (RACH) sub-channel, and ASs that start from the start AS and whose quantity is the quantity of PRACH preamble repetitions are used by same user equipment (UE) to send a same PRACH preamble; and a sending module, configured to send the access slot information to each UE, so that each UE repeatedly sends a PRACH preamble to a base station according to the access slot information.

With reference to the third aspect, in a first possible implementation of the third aspect, there is at least one RACH sub-channel.

With reference to the third aspect or the first possible implementation of the third aspect, in a second possible implementation of the third aspect, the start AS corresponding to each random access channel (RACH) sub-channel is a start AS corresponding to each RACH sub-channel in the case of different system frame numbers (SFNs).

With reference to the second possible implementation of the third aspect, in a third possible implementation of the third aspect, the SFN indicates the quantity of PRACH preamble repetitions corresponding to the start AS.

With reference to any one of the third aspect or the first or the second possible implementation of the third aspect, in a fourth possible implementation of the third aspect, the start AS indicates the quantity of PRACH preamble repetitions corresponding to the start AS.

According to a fourth aspect, an embodiment of the present application provides user equipment (UE). The user equipment includes:

a receiving module, configured to receive access slot information from a controller, where the access slot information includes a start access slot (AS) corresponding to each random access channel (RACH) sub-channel, and ASs that start from the start AS and whose quantity is a quantity of PRACH preamble repetitions are used by same UE to send a same PRACH preamble; and a sending module, configured to repeatedly send a PRACH preamble to a base station according to the access slot information.

With reference to the fourth aspect, in a first possible implementation of the fourth aspect, there is at least one RACH sub-channel.

With reference to the fourth aspect or the first possible implementation of the fourth aspect, in a second possible implementation of the fourth aspect, the start AS corresponding to each random access channel (RACH) sub-channel is a start AS corresponding to each RACH sub-channel in the case of different system frame numbers (SFNs).

With reference to the second possible implementation of the fourth aspect, in a third possible implementation of the fourth aspect, the SFN indicates the quantity of PRACH preamble repetitions corresponding to the start AS.

With reference to any one of the fourth aspect or the first or the second possible implementation of the fourth aspect, in a fourth possible implementation of the fourth aspect, the start AS indicates the quantity of PRACH preamble repetitions corresponding to the start AS.

With reference to any one of the fourth aspect or the first to the fourth possible implementations of the fourth aspect, in a fifth possible implementation of the fourth aspect, the sending module is configured to: determine that the quantity of PRACH preamble repetitions is N, where N is a positive integer greater than or equal to 1; determine, according to the access slot information, that a quantity of PRACH preamble repetitions corresponding to a first start AS is N; and repeatedly send, in N ASs starting from the first start AS, the PRACH preamble to the base station for N times.

According to a fifth aspect, an embodiment of the present application provides a physical random access channel (PRACH) preamble sending system, including the controller according to any one of the third aspect or the first to the fourth possible implementations of the third aspect, and the user equipment (UE) according to any one of the fourth aspect or the first to the fifth possible implementations of the fourth aspect.

According to a sixth aspect, an embodiment of the present application provides a controller. The controller includes:

a processor, configured to determine access slot information according to at least one PRACH preamble repetition, where the access slot information includes a start access slot (AS) corresponding to each random access channel (RACH) sub-channel, and ASs that start from the start AS and whose quantity is the quantity of PRACH preamble repetitions are used by same user equipment (UE) to send a same PRACH preamble; and a transmitter, configured to send the access slot information to each UE, so that each UE repeatedly sends a PRACH preamble to a base station according to the access slot information.

With reference to the sixth aspect, in a first possible implementation of the sixth aspect, there is at least one RACH sub-channel.

With reference to the sixth aspect or the first possible implementation of the sixth aspect, in a second possible implementation of the sixth aspect, the start AS corresponding to each random access channel (RACH) sub-channel is a start AS corresponding to each RACH sub-channel in the case of different system frame numbers (SFNs).

With reference to the second possible implementation of the sixth aspect, in a third possible implementation of the sixth aspect, the SFN indicates the quantity of PRACH preamble repetitions corresponding to the start AS.

With reference to any one of the sixth aspect or the first or the second possible implementation of the sixth aspect, in a fourth possible implementation of the sixth aspect, the start AS indicates the quantity of PRACH preamble repetitions corresponding to the start AS.

According to a seventh aspect, an embodiment of the present application provides user equipment (UE). The user equipment includes:

a receiver, configured to receive access slot information from a controller, where the access slot information includes a start access slot (AS) corresponding to each random access channel (RACH) sub-channel, and ASs that start from the start AS and whose quantity is a quantity of PRACH preamble repetitions are used by same UE to send a same PRACH preamble;

a processor, configured to determine, according to the access slot information, to repeatedly send, in ASs that start from a first start AS and whose quantity is the quantity of PRACH preamble repetitions, a PRACH preamble to a base station; and a transmitter, configured to repeatedly send, in the ASs that start from the first start AS and whose quantity is the quantity of PRACH preamble repetitions, the PRACH preamble to the base station.

With reference to the seventh aspect, in a first possible implementation of the seventh aspect, there is at least one RACH sub-channel.

With reference to the seventh aspect or the first possible implementation of the seventh aspect, in a second possible implementation of the seventh aspect, the start AS corresponding to each random access channel (RACH) sub-channel is a start AS corresponding to each RACH sub-channel in the case of different system frame numbers (SFNs).

With reference to the second possible implementation of the seventh aspect, in a third possible implementation of the seventh aspect, the SFN indicates the quantity of PRACH preamble repetitions corresponding to the start AS.

With reference to any one of the seventh aspect or the first or the second possible implementation of the seventh aspect, in a fourth possible implementation of the seventh aspect, the start AS indicates the quantity of PRACH preamble repetitions corresponding to the start AS.

With reference to any one of the seventh aspect or the first to the fourth possible implementations of the seventh aspect, in a fifth possible implementation of the seventh aspect, the processor is configured to: determine that the quantity of PRACH preamble repetitions is N, where N is a positive integer greater than or equal to 1; and determine, according to the access slot information, that a quantity of PRACH preamble repetitions corresponding to the first start AS is N; and the transmitter is configured to repeatedly send, in N ASs starting from the first start AS, the PRACH preamble to the base station for N times.

According to the PRACH preamble sending method, the device, and the system that are provided in the present application, the controller determines the access slot information according to the at least one PRACH preamble repetition, where the access slot information includes the start AS corresponding to each RACH sub-channel, and the ASs that start from the start AS and whose quantity is the quantity of PRACH preamble repetitions are used by same UE to send a same PRACH preamble; and the controller sends the access slot information to each UE, so that each UE repeatedly sends a PRACH preamble to the base station according to the access slot information, and the ASs that start from the start AS and whose quantity is the quantity of PRACH preamble repetitions are all used by the same UE to repeatedly send the PRACH preamble to the base station. This resolves a problem that a possibility of a collision is increased due to repeatedly sending the PRACH preamble, thereby reducing a probability of an access failure.

BRIEF DESCRIPTION OF DRAWINGS

To describe the technical solutions in the embodiments of the present application or in the prior art more clearly, the following briefly describes the accompanying drawings required for describing the embodiments or the prior art. Apparently, the accompanying drawings in the following description show some embodiments of the present application, and persons of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by persons of ordinary skill in the art based on the embodiments of the present application without creative efforts shall fall within the protection scope of the present application.

In a random access process, UE randomly selects an AS from a sub-set of access slots defined by a RACH sub-channel that is available to the UE. In the prior art, a correspondence between a RACH sub-channel and an AS is shown in Table 1. It should be noted that in Table 1, 0 to 11 in a row closely adjacent to the row of "RACH sub-channel number" respectively represent twelve RACH sub-channels, 0 to 7 in a same column as "SFN % 8" respectively represent eight remainders obtained after a system frame number (SFN) modulo 8, and other numbers 0 to 14 are used to represent numbers of ASs.

TABLE 1

| | RACH sub-channel number | | | | | | | | | | | |
|---|---|---|---|---|---|---|---|---|---|---|---|---|
| SFN %8 | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | 0 | 1 | 2 | 3 | 4 | 5 | 6 | 7 | | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |

Figure 1:
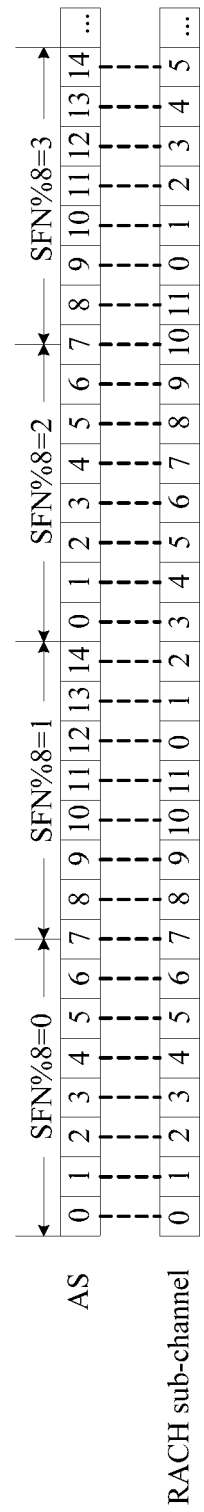
FIG. 1 is a diagram of a correspondence between a RACH sub-channel and an AS in the prior art.

FIG. 1 is a diagram of a correspondence between a RACH sub-channel and an AS in the prior art. Implications of FIG. 1 are similar to those of Table 1, and details are not described herein again.

Figure 2:
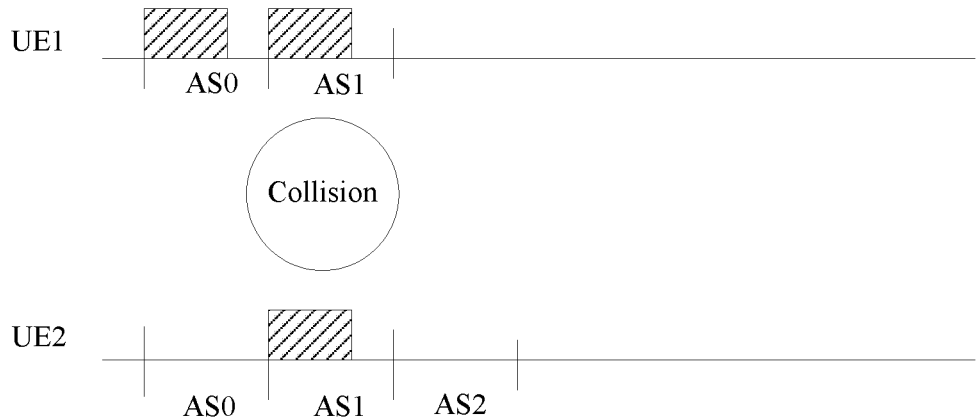
FIG. 2 is a schematic diagram of an access failure of UE caused by repeatedly sending a PRACH preamble in the prior art.

FIG. 2 is a schematic diagram of an access failure of UE caused by repeatedly sending a PRACH preamble in the prior art. It is assumed that two UEs (for example, UE1 and UE2) in the prior art each need to initiate a random access;

the UE1 selects the zeroth AS (that is, AS0) in the case of SFN0 to send a PRACH preamble 1 (in FIG. 2, the preamble 1 is represented by an area filled with diagonal stripes), and repeatedly sends the PRACH preamble 1 in the first AS (that is, AS1); the UE2 also selects the first AS in the case of the SFN0 to send the PRACH preamble 1. As shown in FIG. 2, the UE1 and the UE2 collide at a position of the first AS. Therefore, a base station cannot distinguish between the PRACH preambles from the UE1 and the UE2, causing access failures of the UE1 and the UE2.

It can be learned that a possibility of a collision is increased due to repeatedly sending the PRACH preamble. As a result, a probability of an access failure is increased. Therefore, the prior art has a problem that there is a relatively high probability of an access failure.

It should be noted that a method for repeatedly sending a PRACH preamble shown in FIG. 2 is that UE sends a same PRACH preamble separately at start positions of multiple consecutive ASs (for example, if a quantity of PRACH preamble repetitions is 4, a same PRACH preamble needs to be sent at start positions of four consecutive ASs). The method in the present application may further be applied when the UE continuously sends a same PRACH preamble for multiple times at a start position of one AS (for example, if a quantity of PRACH preamble repetitions is 4, a same PRACH preamble needs to be continuously sent for four times at a start position of an AS).

Figure 3:
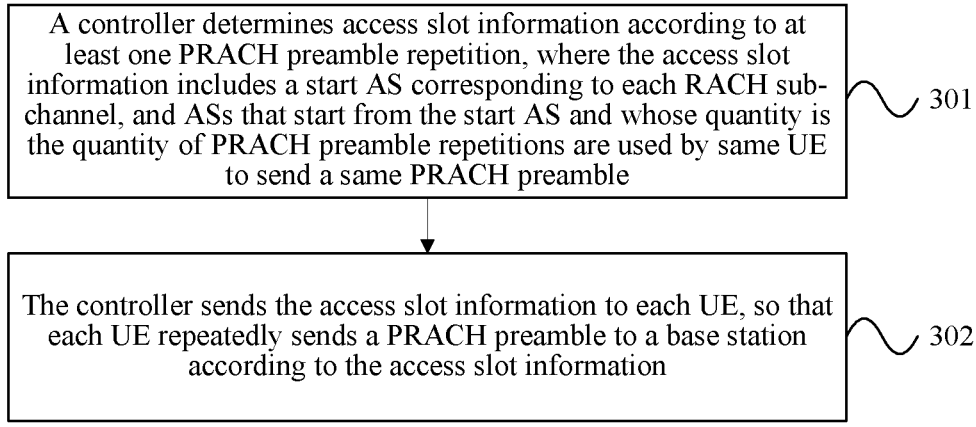
FIG. 3 is a flowchart of Embodiment 1 of a PRACH preamble sending method according to the present application.

FIG. 3 is a flowchart of Embodiment 1 of a PRACH preamble sending method according to the present application. As shown in FIG. 3, the method in this embodiment may include the following steps.

Step 301: A controller determines access slot information according to at least one PRACH preamble repetition, where the access slot information includes a start AS corresponding to each RACH sub-channel, and ASs that start from the start AS and whose quantity is the quantity of PRACH preamble repetitions are used by same UE to send a same PRACH preamble.

It should be noted that all of N−1 (N is the quantity of repetitions) ASs after the start AS are unavailable start ASs. That is, the UE cannot initiate an access in the N−1 ASs.

Optionally, the controller may be a radio network controller (RNC).

It should be noted that the PRACH preamble occupies 4096 (4096=16*256) chips, and each AS includes 5120 chips. Therefore, the quantity of PRACH preamble repetitions is equal to a quantity of ASs (for example, if the UE needs to repeatedly send a PRACH preamble A for eight times, eight ASs need to be occupied).

Step 302: The controller sends the access slot information to each UE, so that each UE repeatedly sends a PRACH preamble to a base station according to the access slot information.

In this embodiment, the controller determines the access slot information according to the at least one PRACH preamble repetition, where the access slot information includes the start AS corresponding to each RACH sub-channel, and the ASs that start from the start AS and whose quantity is the quantity of PRACH preamble repetitions are used by same UE to send a same PRACH preamble; and the controller sends the access slot information to each UE, so that each UE repeatedly sends a PRACH preamble to the base station according to the access slot information, and the ASs that start from the start AS and whose quantity is the quantity of PRACH preamble repetitions are all used by the same UE to repeatedly send the PRACH preamble to the base station. This resolves a problem that a possibility of a collision is increased due to repeatedly sending the PRACH preamble, thereby reducing a probability of an access failure.

Figure 4:
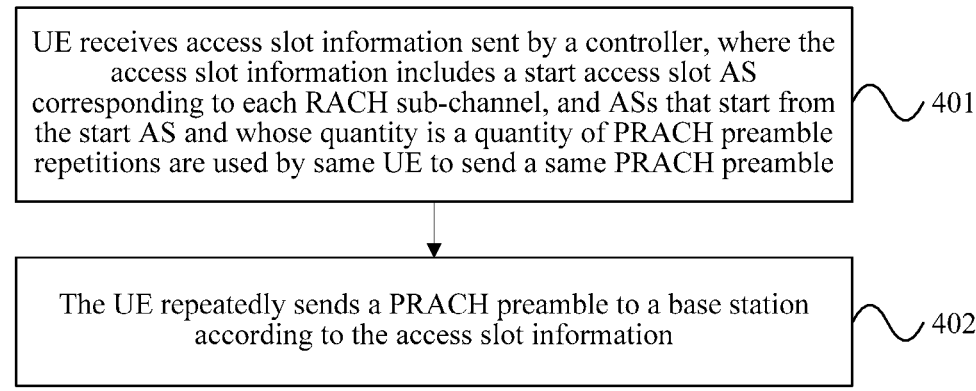
FIG. 4 is a flowchart of Embodiment 2 of a PRACH preamble sending method according to the present application.

FIG. 4 is a flowchart of Embodiment 2 of a PRACH preamble sending method according to the present application. As shown in FIG. 4, the method in this embodiment may include the following steps.

Step 401: UE receives access slot information from a controller, where the access slot information includes a start access slot (AS) corresponding to each RACH sub-channel, and ASs that start from the start AS and whose quantity is a quantity of PRACH preamble repetitions are used by same UE to send a same PRACH preamble.

Step 402: The UE repeatedly sends a PRACH preamble to a base station according to the access slot information.

In this embodiment, the UE receives the access slot information from the controller, where the access slot information includes the start access slot (AS) corresponding to each RACH sub-channel, and the ASs that start from the start AS and whose quantity is the quantity of PRACH preamble repetitions are used by same UE to send a same PRACH preamble; and the UE repeatedly sends the PRACH preamble to the base station according to the access slot information, so that the ASs that start from the start AS and whose quantity is the quantity of PRACH preamble repetitions are all used by the same UE to repeatedly send the PRACH preamble to the base station. This resolves a problem that a possibility of a collision is increased due to repeatedly sending the PRACH preamble, thereby reducing a probability of an access failure.

Embodiment 3 of PRACH Preamble Sending Method

This embodiment is an example of determining, by a controller, access slot information according to a quantity of PRACH preamble repetitions.

Scenario 1: Assuming that numbers of ASs are respectively 0 to 14, a quantity of PRACH preamble repetitions is 8, and a quantity of RACH sub-channels is 12 and numbers thereof are respectively 0 to 11, access slot information may be specifically shown in Table 2. In Table 2, 0 to 11 in a row closely adjacent to the row of "RACH sub-channel number" respectively represent twelve RACH sub-channels, 0 to 15 in a same column as "SFN % 16" respectively represent sixteen remainders obtained after an SFN modulo 16, and other numbers 0 to 14 are used to represent numbers of start ASs.

TABLE 2

| SFN %16 | RACH sub-channel number | | | | | | | | | | | |
| --- | --- | --- | --- | --- | --- | --- | --- | --- | --- | --- | --- | --- |
| | 0 | 1 | 2 | 3 | 4 | 5 | 6 | 7 | 8 | 9 | 10 | 11 |
| 0 | 0 | | | | | | | | | | | |
| 1 | | | | | | | | | 8 | | | |
| 2 | | | | | 1 | | | | | | | |
| 3 | 9 | | | | | | | | | | | |
| 4 | | | | | | | | | 2 | | | |
| 5 | | | | | | | | | | | 10 | |
| 6 | 3 | | | | | | | | | | | |
| 7 | | | | | | | | | | | | 11 |
| 8 | | | | | 4 | | | | | | | |
| 9 | 12 | | | | | | | | | | | |
| 10 | | | | | | | | | | | 5 | |
| 11 | | | | | | | | | | | | 13 |
| 12 | 6 | | | | | | | | | | | |

TABLE 2-continued

| SFN %16 | \multicolumn{12}{c}{RACH sub-channel number} |
|---|---|---|---|---|---|---|---|---|---|---|---|---|
|  | 0 | 1 | 2 | 3 | 4 | 5 | 6 | 7 | 8 | 9 | 10 | 11 |
| 13 |   |   |   |   |   |   |   |   | 14 |   |   |   |
| 14 |   |   |   |   | 7 |   |   |   |   |   |   |   |
| 15 |   |   |   |   |   |   |   |   |   |   |   |   |

As shown in Table 2, when SFN % 16 is equal to 0, a start AS corresponding to a number 0 RACH sub-channel is a number 0 AS. It indicates that eight ASs starting from the zeroth AS in the case of a radio frame for which SFN % 16 is equal to 0 are used by same UE to send a same PRACH preamble.

It should be noted that blank spaces in Table 2 represent unavailable start ASs. For example, seven ASs after the zeroth AS are unavailable start ASs.

Figure 5:
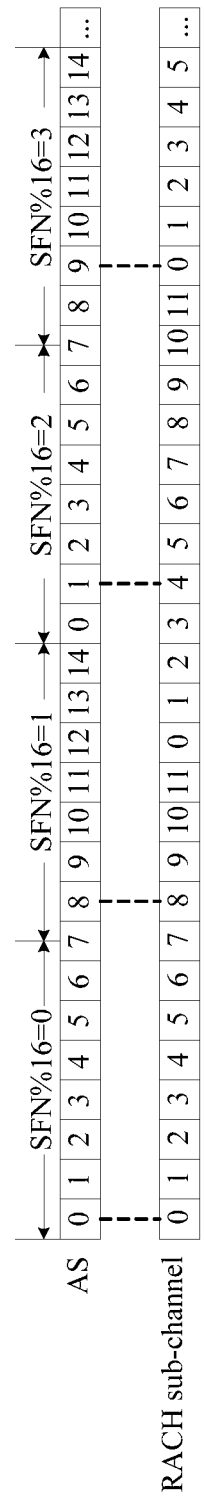
FIG. 5 is a first diagram of a correspondence between a RACH sub-channel and a start AS according to the present application.

FIG. 5 is a first diagram of a correspondence between a RACH sub-channel and a start ASs according to the present application. Implications of FIG. 5 are similar to those of Table 2, and details are not described herein again.

It should be noted that an SFN period may be determined by multiplying a lowest common multiple of a quantity of RACH sub-channels, a quantity of ASs, and a quantity of PRACH preamble repetitions by 2, and then dividing an obtained result by the quantity of ASs. For example, when the quantity of RACH sub-channels is equal to 12, the quantity of ASs is equal to 15, and the quantity of PRACH preamble repetitions is equal to 8, the lowest common multiple of the three is 120. 120 is multiplied by 2 and then is divided by 15 makes 16.

Scenario 2: Assuming that a quantity of PRACH preamble repetitions is 4, and other conditions are the same as those corresponding to Table 2, access slot information may be specifically shown in Table 3.

TABLE 3

| SFN %8 | \multicolumn{12}{c}{RACH sub-channel number} |
|---|---|---|---|---|---|---|---|---|---|---|---|---|
|  | 0 | 1 | 2 | 3 | 4 | 5 | 6 | 7 | 8 | 9 | 10 | 11 |
| 0 | 0 |   |   |   | 4 |   |   |   |   |   |   |   |
| 1 | 12 |   |   |   |   |   |   |   | 8 |   |   |   |
| 2 |   |   |   |   | 1 |   |   |   | 5 |   |   |   |
| 3 | 9 |   |   |   | 13 |   |   |   |   |   |   |   |
| 4 | 6 |   |   |   |   |   |   |   | 2 |   |   |   |
| 5 |   |   |   |   | 10 |   |   |   | 14 |   |   |   |
| 6 | 3 |   |   |   | 7 |   |   |   |   |   |   |   |
| 7 |   |   |   |   |   |   |   |   | 11 |   |   |   |

Figure 6:
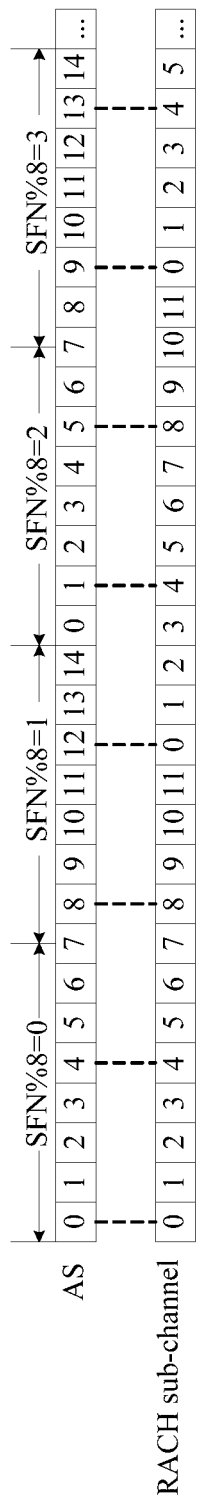
FIG. 6 is a second diagram of a correspondence between a RACH sub-channel and a start AS according to the present application.

FIG. 6 is a second diagram of a correspondence between a RACH sub-channel and a start AS according to the present application. Implications of FIG. 6 are similar to those of Table 3, and details are not described herein again.

As shown in Table 3, when SFN % 8 is equal to 0, a start AS corresponding to a number 0 RACH sub-channel is a number 0 AS. It indicates that four ASs starting from the zeroth AS in the case of a radio frame for which SFN % 8 is equal to 0 are used by same UE to send a same PRACH preamble.

It should be noted that blank spaces in Table 3 represent unavailable start ASs. For example, three ASs after the zeroth AS are unavailable start ASs.

Scenario 3: Assuming that a quantity of PRACH preamble repetitions is 2, and other conditions are the same as those corresponding to Table 2, access slot information may be specifically shown in Table 4.

TABLE 4

| SFN %7 | \multicolumn{12}{c}{RACH sub-channel number} |
|---|---|---|---|---|---|---|---|---|---|---|---|---|
|  | 0 | 1 | 2 | 3 | 4 | 5 | 6 | 7 | 8 | 9 | 10 | 11 |
| 0 | 0 |   | 2 |   | 4 |   | 6 |   |   |   |   |   |
| 1 | 12 |   | 14 |   |   |   |   |   | 8 |   | 10 |   |
| 2 |   |   |   |   | 1 |   | 3 |   | 5 |   | 7 |   |
| 3 | 9 |   | 11 |   | 13 |   |   |   |   |   |   |   |
| 4 | 6 |   |   |   |   |   | 0 |   | 2 |   | 4 |   |
| 5 |   |   | 8 |   | 10 |   | 12 |   | 14 |   |   |   |
| 6 | 3 |   | 5 |   | 7 |   |   |   |   |   | 1 |   |
| 7 |   |   |   |   |   |   | 9 |   | 11 |   | 13 |   |

Figure 7:
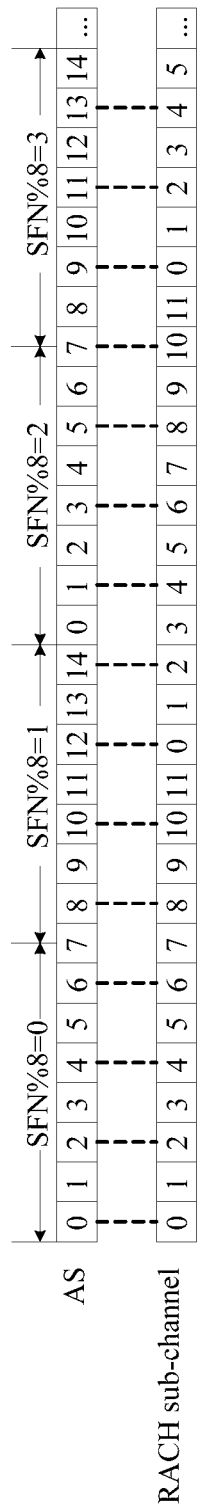
FIG. 7 is a third diagram of a correspondence between a RACH sub-channel and a start AS according to the present application.

FIG. 7 is a third diagram of a correspondence between a RACH sub-channel and a start AS according to the present application. Implications of FIG. 7 are similar to those of Table 4, and details are not described herein again.

As shown in Table 4, when SFN % 7 is equal to 0, a start AS corresponding to a number 0 RACH sub-channel is a number 0 AS. It indicates that two ASs starting from the zeroth AS in the case of a radio frame for which SFN % 7 is equal to 0 are used by same UE to send a same PRACH preamble.

It should be noted that blank spaces in Table 4 represent unavailable start ASs. For example, one AS after the zeroth AS is an unavailable start AS.

It should be noted that in Table 2 to Table 4, a length of a RACH sub-channel is the same as a length of an AS (for example, both are 5120 chips). Optionally, a length of a RACH sub-channel may alternatively be an integer multiple of a length of an AS. Details are specifically shown in Table 5 to Table 7 below.

Scenario 4: Assuming that numbers of ASs are 0 to 14, a quantity of PRACH preamble repetitions is 8, a length of a RACH sub-channel is eight times that of an AS, and a quantity of RACH sub-channels is 1 (1 is equal to dividing 12 by 8 and rounding down an obtained result) and a number thereof is 0, access slot information may be specifically shown in Table 5.

TABLE 5

| SFN % 16 | RACH sub-channel number |
|---|---|
|  | 0 |
| 0 | 0 |
| 1 | 8 |
| 2 | 1 |
| 3 | 9 |
| 4 | 2 |
| 5 | 10 |
| 6 | 3 |
| 7 | 11 |
| 8 | 4 |
| 9 | 12 |
| 10 | 5 |
| 11 | 13 |
| 12 | 6 |
| 13 | 14 |
| 14 | 7 |
| 15 |   |

It can be learned from Table 5 that there may be one RACH sub-channel.

Scenario 5: Assuming that a quantity of PRACH preamble repetitions is 4, a length of a RACH sub-channel is four times that of an AS, a quantity of RACH sub-channels is 3 (3 is equal to dividing 12 by 4 and rounding down an obtained result) and numbers thereof are 0 to 2, and other conditions are the same as those corresponding to Table 5, access slot information may be specifically shown in Table 6.

TABLE 6

| SFN % 16 | RACH sub-channel number | | |
|---|---|---|---|
| | 0 | 1 | 2 |
| 0 | 0 | | 4 |
| 1 | 12 | | 8 |
| 2 | | 1 | 5 |
| 3 | 9 | 13 | |
| 4 | 6 | | 2 |
| 5 | | 10 | 14 |
| 6 | 3 | 7 | |
| 7 | | | 11 |

It can be learned from Table 6 that there may be multiple RACH sub-channels.

Scenario 6: Assuming that a quantity of PRACH preamble repetitions is 2, a length of a RACH sub-channel is twice that of an AS, a quantity of RACH sub-channels is 6 (6 is equal to dividing 12 by 2 and rounding down an obtained result) and numbers thereof are 0, 1, 2, 3, 4, and 5, and other conditions are the same as those corresponding to Table 5, access slot information may be specifically shown in Table 7.

TABLE 7

| SFN %8 | RACH sub-channel number | | | | | |
|---|---|---|---|---|---|---|
| | 0 | 1 | 2 | 3 | 4 | 5 |
| 0 | 0 | 2 | 4 | 6 | | |
| 1 | 12 | 12 | | | 8 | 10 |
| 2 | | | 1 | 3 | 5 | 7 |
| 3 | 9 | 11 | 13 | | | |
| 4 | 6 | | | 0 | 2 | 4 |
| 5 | | 8 | 10 | 12 | 14 | |
| 6 | 3 | 5 | 7 | | | 1 |
| 7 | | | | 9 | 11 | 13 |

It should be noted that the quantity of PRACH preamble repetitions described in this embodiment may be from the controller to the UE.

Embodiment 4 of PRACH Preamble Sending Method

This embodiment is an example of determining, by a controller, access slot information according to multiple PRACH preamble repetitions.

Scenario 7: Assuming that a quantity of RACH sub-channels is 12 and numbers thereof are 0 to 11, numbers of ASs are 0 to 14, and quantities of PRACH preamble repetitions are 1, 4, and 8, access slot information may be specifically shown in Table 8.

TABLE 8

| SFN %16 | RACH sub-channel number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | | | | | | | | 8 | | | |
| 2 | | | 1 | | | | | | | | | |
| 3 | 9 | 10 | 11 | 12 | 13 | 14 | | | | | | |
| 4 | | | | | | 0 | | | 4 | | | |
| 5 | | | 8 | | | | | | | | | |
| 6 | 3 | 4 | 5 | 6 | 7 | | | | | | 1 | 2 |
| 7 | | | | | | 8 | | | 12 | | | |
| 8 | | | 1 | | | | | | | | | |
| 9 | | 12 | 13 | 14 | | | | | | 9 | 10 | 11 |

TABLE 8-continued

| SFN %16 | RACH sub-channel number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 10 | | | | 0 | | | | 4 | | | | |
| 11 | | | | | | | | | | | | 8 |
| 12 | 6 | 7 | | | | | | 1 | 2 | 3 | 4 | 5 |
| 13 | | | | 8 | | | | 12 | | | | |
| 14 | | | | | | | | | | | 1 | |
| 15 | | | | | | | 9 | 10 | 11 | 12 | 13 | 14 |

Optionally, an SFN may be used to indicate a quantity of PRACH preamble repetitions corresponding to a start AS.

For example, in Table 8, when SFN % 3=0, the quantity of PRACH preamble repetitions corresponding to the start AS is 1; when SFN % 3=1, the quantity of PRACH preamble repetitions corresponding to the start AS is 4, and three ASs after the start AS are unavailable start ASs; when SFN % 3=2, the quantity of PRACH preamble repetitions corresponding to the start AS is 8, and seven ASs after the start AS are unavailable start ASs.

Figure 8:
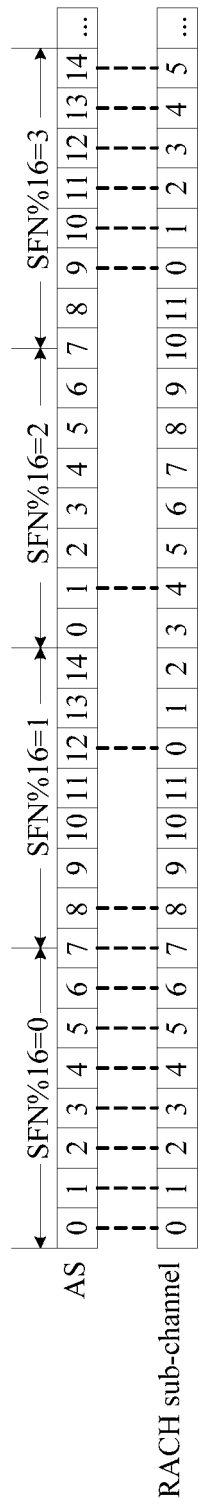
FIG. 8 is a fourth diagram of a correspondence between a RACH sub-channel and a start AS according to the present application.

FIG. 8 is a fourth diagram of a correspondence between a RACH sub-channel and a start AS according to the present application. Implications of FIG. 8 are similar to those of Table 8, and details are not described herein again.

Optionally, the start AS in the present application may be used to indicate the quantity of PRACH preamble repetitions corresponding to the start AS.

Scenario 8: Assuming that a quantity of RACH sub-channels is 12 and numbers thereof are 0 to 11, numbers of ASs are 0 to 14, a quantity of PRACH preamble repetitions corresponding to start ASs numbered 0 to 2 is 1, a quantity of PRACH preamble repetitions corresponding to start ASs numbered 3 to 6 is 4, and a quantity of PRACH preamble repetitions corresponding to start ASs numbered 7 to 14 is 8, access slot information may be specifically shown in Table 9.

TABLE 9

| SFN %8 | RACH sub-channel number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | | | | 7 | | | | |
| 1 | | | | | | | | | | | | |
| 2 | | | 0 | 1 | 2 | 3 | | | | 7 | | |
| 3 | | | | | | | | | | | | |
| 4 | | 7 | | | | | 0 | 1 | 2 | 3 | | |
| 5 | | | | | | | | | | | | |
| 6 | 3 | | | | | 7 | | | | 0 | 1 | 2 |
| 7 | | | | | | | | | | | | |

Figure 9:
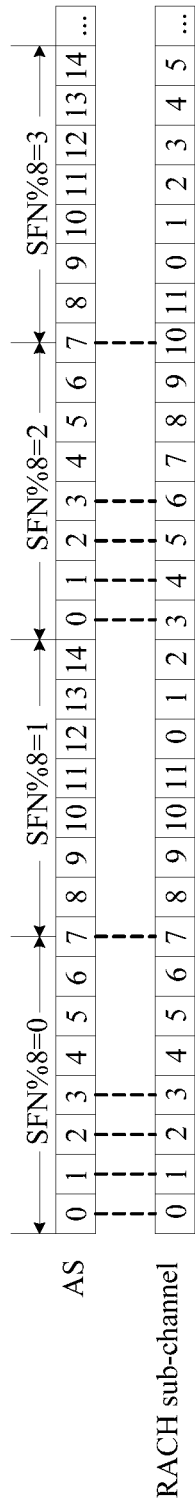
FIG. 9 is a fifth diagram of a correspondence between a RACH sub-channel and a start AS according to the present application.

FIG. 9 is a fifth diagram of a correspondence between a RACH sub-channel and a start AS according to the present application. Implications of FIG. 9 are similar to those of Table 9, and details are not described herein again.

Optionally, for the foregoing different scenarios, step 402 may be determining, by the UE, that the quantity of PRACH preamble repetitions is N, where N is a positive integer greater than or equal to 1; determining, by the UE according to the access slot information, that a quantity of PRACH preamble repetitions corresponding to a first start AS is N; and repeatedly sending, by the UE in N ASs starting from the first start AS, the PRACH preamble to the base station for N times.

Figure 10:
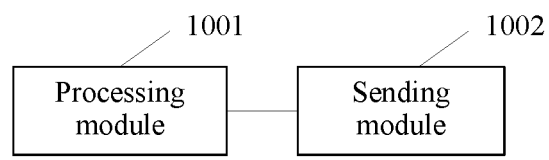
FIG. 10 is a schematic structural diagram of Embodiment 1 of a controller according to the present application.

FIG. 10 is a schematic structural diagram of Embodiment 1 of a controller according to the present application. As shown in FIG. 10, the controller in this embodiment may include a processing module 1001 and a sending module 1002. The processing module 1001 is configured to determine access slot information according to at least one PRACH preamble repetition, where the access slot information includes a start access slot (AS) corresponding to each random access channel (RACH) sub-channel, and ASs that start from the start AS and whose quantity is the quantity of PRACH preamble repetitions are used by same user equipment (UE) to send a same PRACH preamble. The sending module 1002 is configured to send the access slot information to each UE, so that each UE repeatedly sends a PRACH preamble to a base station according to the access slot information.

Optionally, there is at least one RACH sub-channel.

Optionally, the start AS indicates the quantity of PRACH preamble repetitions corresponding to the start AS.

Optionally, the start AS corresponding to each random access channel (RACH) sub-channel is a start AS corresponding to each RACH sub-channel in the case of different system frame numbers (SFNs).

Further optionally, the SFN indicates the quantity of PRACH preamble repetitions corresponding to the start AS.

The controller in this embodiment may be configured to perform the technical solution in Embodiment 1 of the PRACH preamble sending method, and technical solutions on a controller side in Embodiment 3 and Embodiment 4 of the PRACH preamble sending methods. Implementation principles and technical effects thereof are similar, and details are not described herein again.

Figure 11:
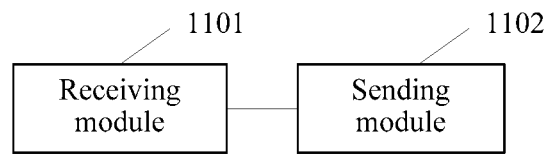
FIG. 11 is a schematic structural diagram of Embodiment 1 of user equipment according to the present application.

FIG. 11 is a schematic structural diagram of Embodiment 1 of user equipment according to the present application. As shown in FIG. 11, the user equipment in this embodiment may include a receiving module 1101 and a sending module 1102. The receiving module 1101 is configured to receive access slot information from a controller, where the access slot information includes a start access slot (AS) corresponding to each random access channel (RACH) sub-channel, and ASs that start from the start AS and whose quantity is a quantity of PRACH preamble repetitions are used by same UE to send a same PRACH preamble. The sending module 1102 is configured to repeatedly send a PRACH preamble to a base station according to the access slot information.

Optionally, there is at least one RACH sub-channel.

Optionally, the start AS indicates the quantity of PRACH preamble repetitions corresponding to the start AS.

Optionally, the start AS corresponding to each random access channel (RACH) sub-channel is a start AS corresponding to each RACH sub-channel in the case of different system frame numbers (SFNs).

Further optionally, the SFN indicates the quantity of PRACH preamble repetitions corresponding to the start AS.

Optionally, the sending module 1102 is configured to: determine that the quantity of PRACH preamble repetitions is N, where N is a positive integer greater than or equal to 1; determine, according to the access slot information, that a quantity of PRACH preamble repetitions corresponding to a first start AS is N; and repeatedly send, in N ASs starting from the first start AS, the PRACH preamble to the base station for N times.

The user equipment in this embodiment may be configured to perform the technical solution in Embodiment 2 of the PRACH preamble sending method, and technical solutions on a UE side in Embodiment 3 and Embodiment 4 of the PRACH preamble sending methods. Implementation principles and technical effects thereof are similar, and details are not described herein again.

The present application further provides a PRACH preamble sending system, including: the controller according to Embodiment 1 of the controller and the UE according to Embodiment 1 of the UE.

The system in this embodiment may be configured to perform the technical solutions of Embodiment 3 and Embodiment 4 of the PRACH preamble sending methods. Implementation principles and technical effects thereof are similar, and details are not described herein again.

Figure 12:
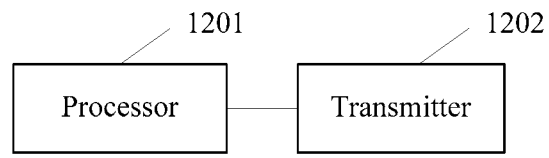
FIG. 12 is a schematic structural diagram of Embodiment 2 of a controller according to the present application.

FIG. 12 is a schematic structural diagram of Embodiment 2 of a controller according to the present application. As shown in FIG. 12, the controller in this embodiment may include a processor 1201 and a transmitter 1202. The processor 1201 is configured to determine access slot information according to at least one PRACH preamble repetition, where the access slot information includes a start access slot (AS) corresponding to each random access channel (RACH) sub-channel, and ASs that start from the start AS and whose quantity is the quantity of PRACH preamble repetitions are used by same user equipment (UE) to send a same PRACH preamble. The transmitter 1202 is configured to send the access slot information to each UE, so that each UE repeatedly sends a PRACH preamble to a base station according to the access slot information.

Optionally, there is at least one RACH sub-channel.

Optionally, the start AS indicates the quantity of PRACH preamble repetitions corresponding to the start AS.

Optionally, the start AS corresponding to each random access channel (RACH) sub-channel is a start AS corresponding to each RACH sub-channel in the case of different system frame numbers (SFNs).

Further optionally, the SFN indicates the quantity of PRACH preamble repetitions corresponding to the start AS.

The controller in this embodiment may be configured to perform the technical solution in Embodiment 1 of the PRACH preamble sending method, and technical solutions on a controller side in Embodiment 3 and Embodiment 4 of the PRACH preamble sending methods. Implementation principles and technical effects thereof are similar, and details are not described herein again.

Figure 13:
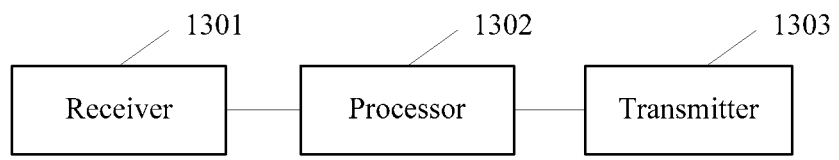
FIG. 13 is a schematic structural diagram of Embodiment 2 of user equipment according to the present application.

FIG. 13 is a schematic structural diagram of Embodiment 2 of user equipment according to the present application. As shown in FIG. 13, the user equipment in this embodiment may include a receiver 1301, a processor 1302, and a transmitter 1303. The receiver 1301 is configured to receive access slot information from a controller, where the access slot information includes a start access slot (AS) corresponding to each random access channel (RACH) sub-channel, and ASs that start from the start AS and whose quantity is a quantity of PRACH preamble repetitions are used by same UE to send a same PRACH preamble. The processor 1302 is configured to determine, according to the access slot information, to repeatedly send, in ASs that start from a first start AS and whose quantity is the quantity of PRACH preamble repetitions, a PRACH preamble to a base station. The transmitter 1303 is configured to repeatedly send, in the ASs that start from the first start AS and whose quantity is the quantity of PRACH preamble repetitions, the PRACH preamble to the base station.

Optionally, there is at least one RACH sub-channel.

Optionally, the start AS indicates the quantity of PRACH preamble repetitions corresponding to the start AS.

Optionally, the start AS corresponding to each random access channel (RACH) sub-channel is a start AS corresponding to each RACH sub-channel in the case of different system frame numbers (SFNs).

Further optionally, the SFN indicates the quantity of PRACH preamble repetitions corresponding to the start AS.

Optionally, the processor 1302 is configured to: determine that the quantity of PRACH preamble repetitions is N, where N is a positive integer greater than or equal to 1; and determine, according to the access slot information, that a quantity of PRACH preamble repetitions corresponding to a first start AS is N.

Correspondingly, the transmitter 1303 is configured to repeatedly send, in N ASs starting from the first start AS, the PRACH preamble to the base station for N times.

The user equipment in this embodiment may be configured to perform the technical solution in Embodiment 2 of the PRACH preamble sending method, and technical solutions on a UE side in Embodiment 3 and Embodiment 4 of the PRACH preamble sending methods. Implementation principles and technical effects thereof are similar, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions in the embodiments of the present application.

What is claimed is:

1. A physical random access channel (PRACH) preamble sending method, comprising:
   receiving, by a user equipment (UE), access slot information from a controller, wherein the received access slot information comprises a start access slot (AS) corresponding to each random access channel (RACH) sub-channel, and wherein ASs that start from the start AS and whose quantity is a quantity of PRACH preamble repetitions are used by the UE to send a same PRACH preamble in each AS of the ASs; and
   repeatedly sending, by the UE, a PRACH preamble to a base station according to the received access slot information.

2. The method according to claim 1, wherein there is at least one RACH sub-channel.

3. The method according to claim 1, wherein a start AS corresponding to each RACH sub-channel comprises a start AS corresponding to each RACH sub-channel under different system frame numbers (SFNs).

4. The method according to claim 3, wherein a particular SFN indicates a quantity of PRACH preamble repetitions corresponding to a particular start AS.

5. The method according to claim 1, wherein a particular start AS indicates a quantity of PRACH preamble repetitions corresponding to the particular start AS.

6. The method according to claim 1, wherein the repeatedly sending, by the UE, the PRACH preamble to the base station according to the received access slot information comprises:
   determining, by the UE, that the quantity of PRACH preamble repetitions is N, wherein N is a positive integer greater than or equal to 1;
   determining, by the UE according to the received access slot information, that a quantity of PRACH preamble repetitions corresponding to a first start AS is N; and
   repeatedly sending, by the UE and in N ASs starting from the first start AS, the PRACH preamble to the base station for N times.

7. An apparatus, comprising:
   at least one processor, the at least one processor configured to determine access slot information according to at least one physical random access channel (PRACH) preamble repetition, wherein the access slot information comprises a start access slot (AS) corresponding to each random access channel (RACH) sub-channel, and wherein ASs that start from the start AS and whose quantity is a quantity of PRACH preamble repetitions are used by a user equipment (UE) to send a same PRACH preamble in each AS of the ASs; and
   a transmitter, the transmitter configured to send the access slot information to each UE for repeatedly sending a PRACH preamble to a base station according to the access slot information.

8. The apparatus according to claim 7, wherein there is at least one RACH sub-channel.

9. The apparatus according to claim 7, wherein a start AS corresponding to each RACH sub-channel comprises a start AS corresponding to each RACH sub-channel under different system frame numbers (SFNs).

10. The apparatus according to claim 9, wherein a particular SFN indicates a quantity of PRACH preamble repetitions corresponding to a particular start AS.

11. The apparatus according to claim 7, wherein a particular start AS indicates a quantity of PRACH preamble repetitions corresponding to the particular start AS.

12. An apparatus, comprising:
   a receiver, the receiver configured to receive access slot information from a controller, wherein the received access slot information comprises a start access slot (AS) corresponding to each random access channel (RACH) sub-channel, and wherein ASs that start from the start AS and whose quantity is a quantity of physical random access channel (PRACH) preamble repetitions are used by a terminal to send a same PRACH preamble in each AS of the ASs;
   at least one processor, the at least one processor configured to determine, according to the received access slot information, to repeatedly send, in ASs that start from a first start AS and whose quantity is the quantity of PRACH preamble repetitions, a PRACH preamble to a base station; and
   a transmitter, the transmitter configured to repeatedly send, in the ASs that start from the first start AS and whose quantity is the quantity of PRACH preamble repetitions, the PRACH preamble to the base station.

13. The apparatus according to claim 12, wherein there is at least one RACH sub-channel.

14. The apparatus according to claim 12, wherein a start AS corresponding to each RACH sub-channel comprises a start AS corresponding to each RACH sub-channel under different system frame numbers (SFNs).

15. The apparatus according to claim 14, wherein a particular SFN indicates a quantity of PRACH preamble repetitions corresponding to a particular start AS.

16. The apparatus according to claim 12, wherein a particular start AS indicates a quantity of PRACH preamble repetitions corresponding to the particular start AS.

17. The apparatus according to claim 12, wherein the at least one processor is configured to determine that the quantity of PRACH preamble repetitions is N, wherein N is a positive integer greater than or equal to 1; and determine, according to the received access slot information, that a quantity of PRACH preamble repetitions corresponding to the first start AS is N; and the transmitter is configured to repeatedly send, in N ASs starting from the first start AS, the PRACH preamble to the base station for N times.

* * * * *